United States Patent
Kim et al.

(10) Patent No.: US 9,211,507 B2
(45) Date of Patent: Dec. 15, 2015

(54) WATER-TREATMENT SEPARATING MEMBRANE OF HIGH FLUX HAVING GOOD CHLORINE RESISTANCE AND METHOD OF MANUFACTURING THE SAME

(71) Applicant: LG CHEM, LTD., Seoul (KR)

(72) Inventors: Jae-Hong Kim, Daejeon (KR); Young-Hoon Ko, Daejeon (KR); Chong-Kyu Shin, Daejeon (KR); Phill Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/260,647

(22) Filed: Apr. 24, 2014

(65) Prior Publication Data

US 2014/0353242 A1 Dec. 4, 2014

Related U.S. Application Data

(63) Continuation of application No. PCT/KR2013/010640, filed on Nov. 21, 2013.

(30) Foreign Application Priority Data

Nov. 21, 2012 (KR) .......................... 10-2012-0132550

(51) Int. Cl.
| | | |
|---|---|---|
| *B01D 39/00* | (2006.01) | |
| *B01D 63/00* | (2006.01) | |
| *B01D 61/00* | (2006.01) | |
| *B05D 5/00* | (2006.01) | |
| *B01D 71/56* | (2006.01) | |
| *B01D 67/00* | (2006.01) | |
| *B01D 69/12* | (2006.01) | |
| *B01D 69/02* | (2006.01) | |

(52) U.S. Cl.
CPC ............ *B01D 71/56* (2013.01); *B01D 67/0006* (2013.01); *B01D 69/02* (2013.01); *B01D 69/125* (2013.01); *B01D 2323/26* (2013.01); *B01D 2323/40* (2013.01); *B01D 2325/06* (2013.01); *B01D 2325/30* (2013.01)

(58) Field of Classification Search
CPC .. B01D 71/56; B01D 69/125; B01D 67/0006; B01D 61/025; B01D 69/10; B05D 5/00; B05D 1/36; B05D 1/02; B05D 1/12; B29C 41/003; B29D 7/01
USPC ......... 210/490, 500.38, 500.27; 427/244, 245
See application file for complete search history.

(56) References Cited

U.S. PATENT DOCUMENTS

| | | | | |
|---|---|---|---|---|
| 4,277,344 A | * | 7/1981 | Cadotte | 210/654 |
| 4,765,897 A | | 8/1988 | Cadotte et al. | |
| 4,872,984 A | * | 10/1989 | Tomaschke | 210/500.38 |

(Continued)

FOREIGN PATENT DOCUMENTS

| | | |
|---|---|---|
| CN | 1159770 A | 9/1997 |
| CN | 1441693 A | 9/2003 |

(Continued)

*Primary Examiner* — Ana Fortuna
(74) *Attorney, Agent, or Firm* — Dentons US LLP

(57) ABSTRACT

A method of manufacturing a water-treatment separating membrane includes forming an aqueous amine solution layer on a porous support, and forming a polyamide active layer by dropping droplets of an organic solution including an acyl halide compound on the aqueous amine solution layer. A water-treatment separating membrane manufactured by the same also is provided.

17 Claims, 11 Drawing Sheets

(56) References Cited

U.S. PATENT DOCUMENTS

| | | | |
|---|---|---|---|
| 5,514,088 A * | 5/1996 | Zakko | 604/31 |
| 5,614,099 A | 3/1997 | Hirose et al. | |
| 5,629,084 A | 5/1997 | Moya | |
| 6,015,495 A | 1/2000 | Koo et al. | |
| 6,162,358 A * | 12/2000 | Li et al. | 210/500.38 |
| 6,368,507 B1 * | 4/2002 | Koo et al. | 210/500.38 |
| 6,413,425 B1 | 7/2002 | Hachisuka et al. | |
| 6,535,605 B1 * | 3/2003 | Ghassabian | 379/433.1 |
| 6,536,605 B2 * | 3/2003 | Rice et al. | 210/490 |
| 6,723,422 B1 | 4/2004 | Hirose et al. | |
| 8,177,978 B2 * | 5/2012 | Kurth et al. | 210/652 |
| 8,684,187 B2 * | 4/2014 | Buschmann | 210/500.38 |
| 2001/0050252 A1 | 12/2001 | Mickols | |
| 2003/0136727 A1 | 7/2003 | Yamada et al. | |
| 2006/0219628 A1 | 10/2006 | Koo et al. | |
| 2007/0175821 A1 * | 8/2007 | Koo et al. | 210/500.38 |
| 2009/0050558 A1 * | 2/2009 | Ishizuka et al. | 210/500.21 |
| 2009/0071903 A1 | 3/2009 | Nakatsuji et al. | |
| 2009/0194479 A1 * | 8/2009 | Niu et al. | 210/638 |
| 2010/0006495 A1 * | 1/2010 | Buschmann | 210/500.25 |
| 2010/0143733 A1 | 6/2010 | Mickols et al. | |
| 2010/0297429 A1 | 11/2010 | Wang et al. | |
| 2012/0255898 A1 | 10/2012 | Buschmann | |
| 2013/0292325 A1 * | 11/2013 | Yoo et al. | 210/500.33 |
| 2013/0327714 A1 * | 12/2013 | Alrasheed et al. | 210/652 |
| 2014/0183227 A1 * | 7/2014 | Barnini | 222/152 |

FOREIGN PATENT DOCUMENTS

| | | |
|---|---|---|
| CN | 1840230 A | 10/2006 |
| CN | 101035607 A | 9/2007 |
| CN | 101325998 A | 12/2008 |
| CN | 101821089 A | 9/2010 |
| JP | 62-213806 A | 9/1987 |
| JP | 05-146654 A | 6/1993 |
| JP | 07-171362 A | 7/1995 |
| JP | 1997-019685 A | 1/1997 |
| JP | 09-187630 A | 7/1997 |
| JP | 10-337454 A | 12/1998 |
| JP | 2001-038175 A | 2/2001 |
| JP | 2001-286741 A | 10/2001 |
| JP | 2008-80255 A | 4/2008 |
| JP | 2009-006315 A | 1/2009 |
| KR | 1998-068304 A | 10/1998 |
| KR | 2002-0001035 A | 1/2002 |
| KR | 10-0516209 B1 | 9/2005 |
| KR | 10-2007-0013651 A | 1/2007 |
| KR | 10-0715454 B1 | 4/2007 |
| KR | 10-0990168 B1 | 10/2010 |
| KR | 10-2011-0083275 A | 7/2011 |
| WO | 2013085657 A1 | 6/2013 |

* cited by examiner

WATER-TREATMENT SEPARATING MEMBRANE OF HIGH FLUX HAVING GOOD CHLORINE RESISTANCE AND METHOD OF MANUFACTURING THE SAME

CROSS-REFERENCE TO RELATED APPLICATIONS

This application is a Continuation Bypass Application of International Patent Application No. PCT/KR2013/010640, filed Nov. 21, 2013, and claims the benefit of Korean Patent Application Nos. 10-2012-0132550 filed on Nov. 21, 2012, 10-2013-0004147 filed on Jan. 14, 2013, and 10-2013-0142099 filed on Nov. 21, 2013, in the Korean Intellectual Property Office, the disclosure of which is incorporated herein by reference.

BACKGROUND OF THE INVENTION

1. Field of the Invention

The present invention relates to a water-treatment separating membrane manufactured by dropping droplets of an organic solution including an acyl halide compound onto an aqueous amine solution layer formed on a porous support.

2. Description of the Related Art

The movement of a solvent between two solutions separated by a semi-permeable membrane, from a solution having a lower concentration of a solute to another solution having a higher concentration of a solute, is known as osmosis. Pressure applied to the solution having the higher concentration of the solute by the movement of the solution is known as osmotic pressure. When a level of external pressure, higher than osmotic pressure, is applied, the solvent may move from the solution having the higher concentration of the solute to the solution having the lower concentration of the solute. This phenomenon is known as reverse osmosis. By using the principle of reverse osmosis, various salts and organic materials may be separated by the semi-permeable membrane by using a pressure gradient as a driving force. A water-treatment separating membrane is used for separating materials on the molecular level, removing salts from saline water and seawater, and providing water for domestic, commercial and industrial uses by using the reverse osmosis phenomenon.

The most important function required for the water-treatment membrane includes the exhibition of the high level of salt rejection with respect to the separating membrane and the maintenance of the high permeation flux of a solvent at a relatively low pressure. To accomplish the above-described conditions, a water-treatment separating membrane having good salt rejection performance while maintaining high permeation flux has been suggested, by forming a thin film of an active polyamide layer for removing salts on a porous support for maintaining mechanical strength of the separating membrane (U.S. Pat. No. 4,277,344). More particularly, the water-treatment separating membrane is manufactured by forming a minute and porous support through forming a polysulfone layer on a non-woven fabric, impregnating the minute and porous support with an aqueous m-phenylenediamine (mPD) solution to form an aqueous amine solution layer, and impregnating the minute and porous support with an organic solution including trimesoyl chloride (TMC) so that the mPD contacts the TMC to allow interfacial polymerization and to form a polyamide layer. According to the above-described method, since a polar solvent, water and a non-polar organic solution contact, the polymerization of mPD and TMC occurs only at the interface therebetween. Thus, a very thin polyamide active layer may be formed.

However, since the above-suggested water-treatment separating membrane has a fast decreasing degree of chlorine resistance with time, the replacement period of the membrane is short. To retard the decreasing degree of the chlorine resistance of the water-treatment separating membrane, a method of increasing a specific surface area of an active layer has been suggested. Japanese Unexamined Patent Publication No. Hei 10-337454 discloses a method of increasing the specific surface area of the skin layer of a water-treatment separating membrane by forming an active layer and impregnating the active layer with an acid solution to form embossing or winkles on the skin layer. Korean Unexamined Patent Publication No. 1998-0068304 discloses a method of increasing surface roughness by post-treating a reverse osmosis composite layer with a strong acid.

However, as disclosed in Japanese Unexamined Patent Publication No. Hei 10-337454, in the case of impregnating a separating membrane including the active layer in the acid solution, the surface of the separating membrane may exhibit an anionic charge, and a contaminating material exhibiting a cationic charge may attach to the separating membrane, thereby decreasing the transmittance of the separating membrane. Thus, a separate post-treatment process of coating the surface of the separator with an electrically neutral polymer is necessary.

In addition, according to the method disclosed in Korean Unexamined Patent publication No. 1998-0068304, a polyamide composite layer is acid treated to overcome the defects concerning the generation of the anionic charge on the surface of the separating membrane and to increase the surface roughness. Then, the surface is secondly coated with an aqueous amine solution and a halide compound. Thus, a separate post-treatment process is also necessary.

SUMMARY OF THE INVENTION

An aspect of the present invention provides a water-treatment separating membrane having a high specific surface area and improved time duration of chlorine resistance, and maintaining high degree of salt rejection and high permeation flux without a separate post-treatment process, and a method of manufacturing the same.

According to an aspect of the present invention, there is provided a method of manufacturing a water-treatment separating membrane including forming an aqueous amine solution layer on a porous support; and forming a polyamide active layer by dropping droplets of an organic solution including an acyl halide compound on the aqueous amine solution layer.

According to another aspect of the present invention, there is provided a water-treatment separating membrane including a polyamide active layer formed on a porous support, wherein the polyamide active layer is formed by dropping the droplets of an organic solution including an acyl halide compound on an aqueous amine solution layer, and an arithmetic mean roughness (Ra) of a surface of the polyamide active layer is from 60 nm to 100 nm.

According to another aspect of the present invention, there is provided a water-treatment separating membrane including a polyamide active layer formed on a porous support, wherein at least one curve pattern formed by connecting two or more arcs in at least a partial area of the polyamide active layer is revealed when the polyamide active layer is dyed using a 0.5% aqueous solution of Rhodamine B.

According to another aspect of the present invention, there is provided a water-treatment separating membrane including a polyamide active layer formed on a porous support, wherein the ratio of a maximum value with respect to a minimum value of the ratio of the peak height of a C=O double bond of a carboxylic acid group with respect to the peak height of a C=O double bond combined with an amide group after treating the polyamide active layer with an acid is from 1.2 to 4 when measured by using a Fourier transform infrared spectrometer (FTIR).

According to the method of manufacturing a water-treatment separating membrane according to the present invention, a water-treatment separating membrane having a large active specific surface area may be manufactured without performing a separate post-treatment process.

In addition, since the water-treatment separating membrane according to the present invention has high surface roughness and has long time duration of chlorine resistance, the high degree of salt rejection and high permeation flux may be maintained for an extended period of time.

BRIEF DESCRIPTION OF THE DRAWINGS

The above and other aspects, features and other advantages of the present invention will be more clearly understood from the following detailed description taken in conjunction with the accompanying drawings, in which:

FIGS. 1A, 1B and 1C provide diagrams illustrating the state of a droplet when the droplet of an organic solution begins dropping from a nozzle, wherein FIG. 1A is a side view, FIG. 1B is a top view, and FIG. 1C is a graph showing the concentration gradient of an acyl halide compound in a droplet or the thickness of interfacial polymerization in a droplet;

FIGS. 2A, 2B and 2C provide diagrams illustrating the state of a droplet immediately after the droplet of an organic solution reaches an aqueous amine solution layer, wherein FIG. 2A is a side view, FIG. 2B is a top view, and FIG. 2C is a graph showing the concentration gradient of an acyl halide compound in a droplet or the thickness of interfacial polymerization in a droplet;

FIGS. 3A, 3B and 3C provides diagrams illustrating the state of a droplet after completing the interfacial polymerization reaction of an organic solution and an aqueous amine solution, wherein FIG. 3A is a side view, FIG. 3B is a top view, and FIG. 3C is a graph showing the concentration gradient of an acyl halide compound in a droplet or the thickness of interfacial polymerization in a droplet;

FIGS. 4A, 4B and 4C provides diagrams illustrating the state when a first droplet with the aqueous amine solution layer is dropped and after a certain time, a second droplet just reaches on the aqueous amine solution layer, wherein FIG. 4A is a side view, FIG. 4B is a top view, and FIG. 4C is a graph showing the concentration gradient of an acyl halide compound in a droplet or the thickness of interfacial polymerization in a droplet;

FIGS. 5A, 5B and 5C provides diagrams illustrating the state during planarization, wherein FIG. 5A is a side view, FIG. 5B is a top view, and FIG. 5C is a graph showing the concentration gradient of an acyl halide compound in a droplet or the thickness of interfacial polymerization in a droplet;

FIGS. 6A, 6B and 6C provides diagrams illustrating the surface state of the polyamide active layer after performing the dropping several times, wherein FIG. 6A is a side view, FIG. 6B is a top view, and FIG. 6C is a graph showing the concentration gradient of an acyl halide compound in a droplet or the thickness of interfacial polymerization in a droplet;

FIGS. 7A, 7B and 7C provides diagrams illustrating the state of the droplets immediately after the droplets of the organic solution reaches a polyamide active layer, wherein FIG. 7A is a side view, FIG. 7B is a top view, and FIG. 7C is a graph showing the concentration gradient of an acyl halide compound in droplets or the thickness of interfacial polymerization in the droplets;

FIGS. 8A, 8B and 8C illustrates diagrams for showing the planarization process of the droplets of the organic solution, wherein FIG. 8A is a side view, FIG. 8B is a top view, and FIG. 8C is a graph showing the concentration gradient of an acyl halide compound in droplets or the thickness of interfacial polymerization in the droplets;

FIGS. 9A, 9B and 9C provides diagrams illustrating the state of the droplets after completing the planarization and interfacial polymerization reaction, wherein FIG. 9A is a side view, FIG. 9B is a top view, and FIG. 9C is a graph showing the concentration gradient of an acyl halide compound in droplets or the thickness of interfacial polymerization in the droplets;

DETAILED DESCRIPTION OF THE PREFERRED EMBODIMENT

Figure 1A:
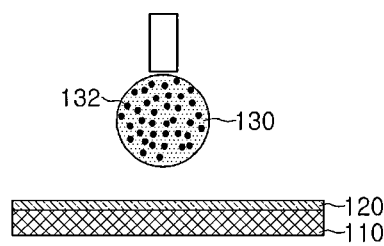

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

The inventors of the present invention found that a conventional method for improving the surface roughness of a separating membrane by impregnating the separating membrane in an acidic solution requires a separate post-treatment process such as a secondary coating. The inventors studied to solve the defect and found that a water-treatment separating membrane having a desired surface roughness was able to be obtained without conducting a post-treatment process by forming an aqueous amine solution layer on a porous support and dropping droplets of an acyl halide organic solution on the aqueous amine solution layer.

More particularly, the present invention relates to a method of manufacturing a water-treatment separating membrane including forming an aqueous amine solution layer on a porous support; and forming a polyamide active layer by dropping the droplets of an organic solution including an acyl halide compound on the aqueous amine solution layer.

According to the method of manufacturing a water-treatment separating membrane, an aqueous amine solution layer is formed first on a porous support.

In this case, well known supports of a water-treatment separating membrane in this art may be used as the porous support without limitation. For example, a support obtained by coating a polymer material on a non-woven fabric may be used. In this case, the polymer material may include, for example, polysulfone, polyethersulfone, polycarbonate, polyethylene oxide, polyimide, polyetherimide, polyether ether ketone, polypropylene, polymethylpentene, polymethyl chloride and polyvinylidene fluoride, however is not limited thereto. Among the materials, the polysulfone is particularly preferable.

Meanwhile, the aqueous amine solution is obtained by dissolving an amine compound in a polar solvent. The amine compound may include any amine compound used for the manufacture of a water-treatment separating membrane without limitation, for examples, a cyclic polyfunctional amine such as cyclohexanediamine, piperazine and a piperazine derivative; an aromatic polyfunctional amine such as m-phenylenediamine, p-phenylenediamine and a derivative thereof; N,N-dimethyl-1,3-phenylenediamine, xylenediamine, benzidine, a benzidine derivative or a mixture thereof. The solvent of the aqueous amine solution is preferably a polar solvent such as water, and an additive such as triethylamine and camphor sulfonic acid may be additionally added in the aqueous amine solution as occasion demands.

Meanwhile, the forming of the aqueous amine solution layer on the porous support may include contacting the porous support with an aqueous amine solution and removing an excessive amount of the aqueous amine solution.

In this case, the contacting of the porous support with the aqueous amine solution may be conducted by using a well known method in this field such as a spraying method, a coating method, a dipping method, a dropping method, and the like, without specific limitation.

Then, the removing of the excessive amount of the aqueous amine solution is conducted for forming an polyamide active layer more uniformly, and may be conducted by using a well known method in this field such as a method using a sponge, an air knife, nitrogen gas blowing, natural drying or a compression roller, without specific limitation.

When an aqueous amine solution layer is formed on the porous support through the above-described process, a polyamide active layer is formed by dropping droplets of an organic solution including an acyl halide compound on the aqueous amine solution layer.

In this case, the acyl halide compound may be, for example, an aromatic compound having 2 or 3 carboxylic acid halide groups and may be a mixture of at least one compound selected from the group consisting of trimesoyl chloride, isophthaloyl chloride and terephthaloyl chloride. However, the present invention is not limited thereto.

Meanwhile, the solvent of the organic solution may be a non-polar solvent and may be, for example, a solution of an alkane compound having 5 to 12 carbon atoms, however, is not limited thereto.

Meanwhile, in the present invention, the forming of the polyamide active layer includes a method of dropping droplets of an organic solution including an acyl halide compound on an aqueous amine solution layer to increase the specific surface area of the polyamide active layer formed by interfacial polymerization.

Generally, a polyamide active layer is formed through a method of immersing a porous support including an aqueous amine solution layer in an organic solution including acyl halide. According to the common method, the organic solution including the acyl halide is uniformly coated on the aqueous amine solution layer. Then, the acyl halide organic solution and the aqueous amine solution layer form a laminar flow, and a polymerization reaction is performed at a stable interface formed by the two solution layers to form a polyamide active layer. As a result, a planar polyamide active layer having a relatively uniform thickness over the whole surface may be formed. However, since the planar polyamide active layer has a small active specific surface area through which water permeates into the surface of the polyamide active layer, permeation flux may decrease with time, and chlorine resistance may be low. Thus, replacement period is fast.

On the contrary, when the droplets of the organic solution including an acyl halide compound is dropped on the aqueous amine solution layer, an irregular interface may be formed when compared to the case using a method such as immersing or coating due to the properties of a dropping method. As a result, a polyamide active layer having a relatively large surface roughness and specific surface area may be formed.

Figure 3A:
Figure 3A:
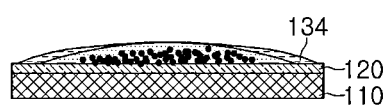
Figure 3B:
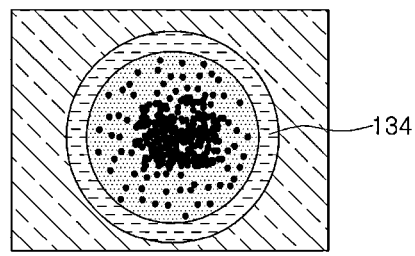
Figure 3C:
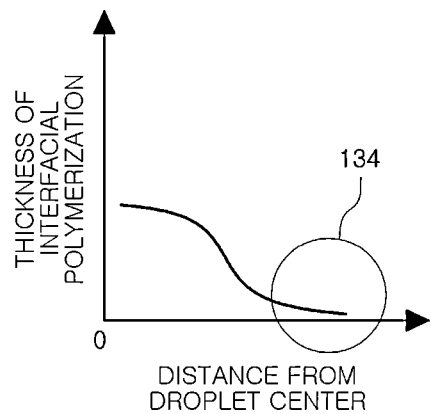

In FIGS. 1A to 3C, the changes in states of a droplet when dropping the droplet of an organic solution on an aqueous amine solution layer are illustrated. More particularly, FIGS. 1A, 1B and 1C provide diagrams illustrating the state of a droplet when the droplet of an organic solution begins dropping from a nozzle, FIGS. 2A, 2B and 2C provide diagrams illustrating the state of a droplet immediately after the droplet of an organic solution reaches an aqueous amine solution layer, and FIGS. 3A, 3B and 3C provide diagrams illustrating the state of a droplet after completing the interfacial polymerization reaction of an organic solution and an aqueous amine solution. In each of the drawings, A is a side view, B is a top view, and C is a graph showing the concentration gradient of an acyl halide compound in a droplet or the thickness of interfacial polymerization in a droplet.

Hereinafter the surface state of a polyamide active layer formed by a dropping method will be explained in more detail referring to FIGS. 1A to 3C.

Figure 1B:
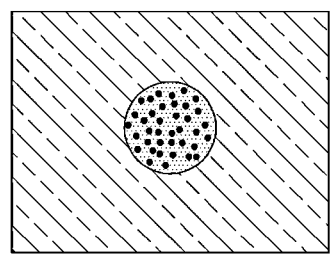
Figure 1C:
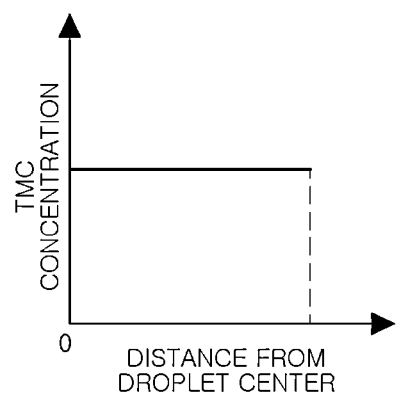
Figure 2A:
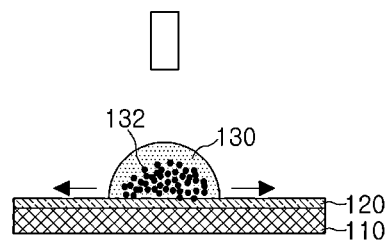
Figure 2B:
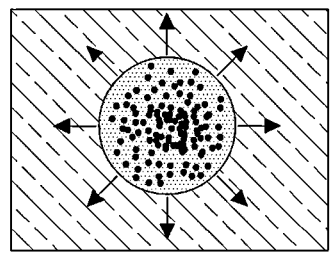
Figure 2C:
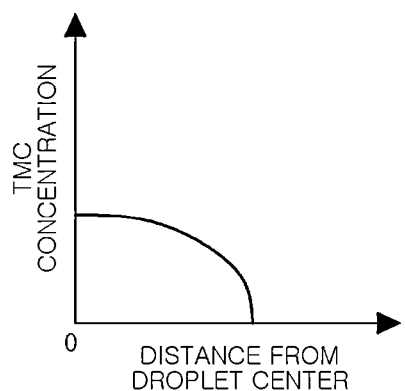

First, at the beginning of the dropping of a droplet from a nozzle, acyl halide compounds 132 are dispersed in a droplet 130 relatively uniformly (See FIGS. 1A, 1B, 1C). The droplet 130 including acyl halide compounds 132 is dropped from the nozzle onto an aqueous amine solution layer 120. When the droplet 130 reaches the aqueous amine solution layer 120, the droplet is spread in all directions on the surface of the amine aqueous solution layer to be planarized (See FIGS. 2A, 2B, 2C). In this case, the moving velocity of an organic solvent is faster than the solute, i.e., the acyl halide compound, relatively more halide compounds may be present at the center portion, and the concentration of the halide compounds may be relatively lowered at the peripheral portion instantaneously. Meanwhile, since the interfacial polymer reaction of the amine compound and the acyl halide compound is very fast, the interfacial polymerization reaction is mostly completed before the concentration of the acyl halide compound in the droplet attains re-equilibrium. Thus, the interfacial polymerization is mostly performed in the center portion, and is rarely performed in peripheral portions. As described above, when the organic solution contacts the aqueous amine solution layer through the dropping method, the interfacial polymerization of the amine compound and the acyl halide compound may be mainly performed in the center portion, and may be rarely performed in the peripheral portions of the droplet. That is, through the planarization of the droplet, a center portion in which the degree of interfacial polymerization of the amine compound and the acyl halide compound is high, and an area 134 (which will be referred to as critical area herein below) in which the degree of interfacial polymerization of the amine compound and the acyl halide compound is low, may be formed (See FIG. 3A and FIG. 3B). As a result, the thickness of the interfacial polymerization, that is, the thickness of a polyamide active layer may decrease from the center portion to the peripheral portion of the droplet, as illustrated in FIG. 3C.

As described above, when the method of dropping the droplet of an organic solution including an acyl halide compound on an aqueous amine solution layer is used, the thickness of a polyamide active layer may become different according to the distance from the center of the droplet. Therefore, the difference of the surface roughness of the polyamide active layer may increase and so, the specific surface area thereof may increase. When the specific surface area of the polyamide active layer is large, the width of the chlorine resistance of a water-treatment separating membrane may decrease, and the salt removing function of the water-treatment separating membrane may be maintained for an extended period of time. Thus, the replacement period of the water-treatment membrane may increase when compared to a planar water-treatment separating membrane having a small specific surface area. In addition, when compared to a method of increasing surface roughness by an acid treatment, the formation degree of a surface anionic charge is small, and a separate post-treatment process such as a secondary coating is not necessary in the present invention.

Meanwhile, the dropping of the droplet of the organic solution may be performed by means of a well known dropping device in this art, for example, a dropping pipette, a syringe or a spraying nozzle.

Meanwhile, in the present invention, the amount of the organic solution dropped on the aqueous amine solution layer may be determined to be with in a range such that the organic solution may be planarized while naturally covering the surface of the aqueous amine solution layer after dropping, and the surface of the active layer may not be planarized. In particular, the dropping amount of the organic solution is from 50 ml to 500 ml per 1 $m^2$ of a unit area of, and may preferably be from 100 ml to 400 ml in the present invention.

In addition, the volume of the organic solution per droplet is from 0.001 ml to 5 ml, preferably is from 0.005 ml to 5 ml, and more preferably is from 0.01 ml to 1 ml in the present invention. In the case that the volume of the organic solution per droplet is less than 0.001 ml, the polyamide active layer may not be formed on the whole surface of the separating membrane, and in the case that the volume of the organic solution per droplet exceeds 5 ml, the polyamide active layer may be planarized, and the specific surface area of the separating membrane may decrease.

Meanwhile, the dropping distance of the droplets of the organic solution is not specifically limited, and the droplets of the organic solution may be dropped at a regular distance, or an irregular distance. In addition, the dropping distance of the droplets of the organic solution may be different or the same according to the dropping direction. For example, the dropping distance may be the same or different in a width direction or the height direction of the water-treatment separating membrane. Alternatively, the droplets may be dropped at a regular distance in one direction, and with an irregular distance in another direction.

When the droplets of the organic solution are dropped at a regular distance, the dropping distance may be from 1 mm to 50 mm, and may more preferably be from 5 mm to 30 mm. When the dropping distance is in the numerical range, a polyamide active layer having good surface roughness may be obtained.

In addition, the droplets of the organic solution may be dropped on the whole aqueous amine solution layer simultaneously or one by one at an interval in the present invention. Alternatively, the droplets of the organic solution may be dropped simultaneously in a first direction, while being dropped one by one at an interval in a second direction, which is perpendicular to the first direction.

FIGS. 4A to 6C provide diagrams illustrating the changes in states of droplets when the droplets of an organic solution are dropped at an interval, and FIGS. 7A to 9C provide diagrams illustrating the changes in states of droplets when a plurality of the droplets of an organic solution is dropped simultaneously.

Figure 4A:
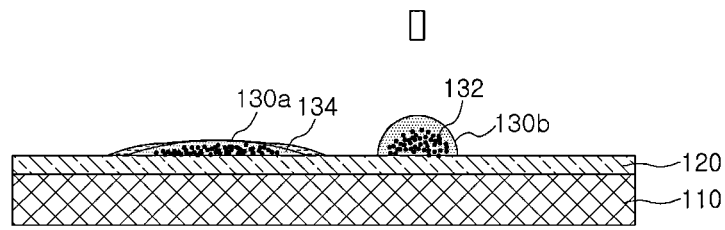
Figure 6A:
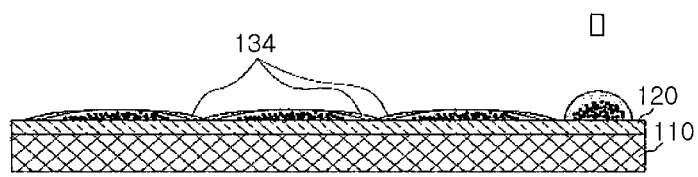
Figure 6B:
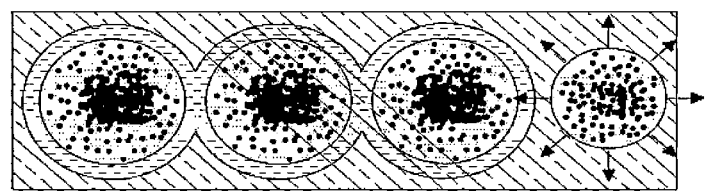
Figure 6C:
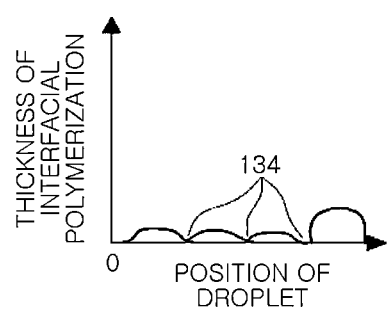

Referring to FIGS. 4A to 6C first, the changes in states of the droplets when the droplets are dropped one by one will be explained. FIGS. 4A, 4B and 4C provide diagrams illustrating the state when a first droplet with the aqueous amine solution layer is dropped and after a certain time, a second droplet just reaches on the aqueous amine solution layer, FIGS. 5A, 5B and 5C provide diagrams illustrating the state during planarization, and FIGS. 6A, 6B and 6C provide diagrams illustrating the surface state of the polyamide active layer after performing the dropping several times. In each of the drawings, A is a side view, B is a top view, and C is a graph showing the concentration gradient of an acyl halide compound in a droplet or the thickness of interfacial polymerization in a droplet.

Figure 4B:
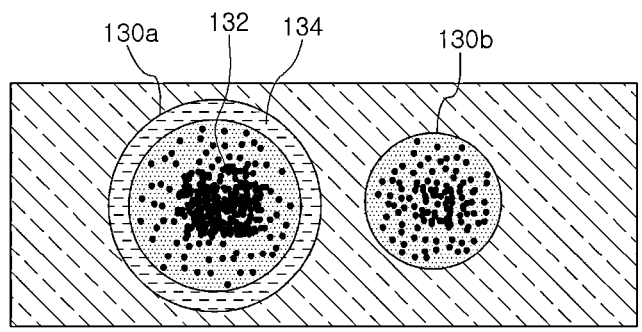
Figure 4C:
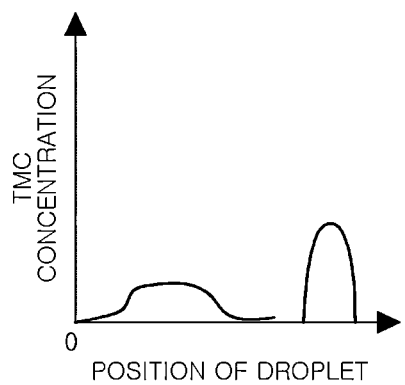
Figure 5A:
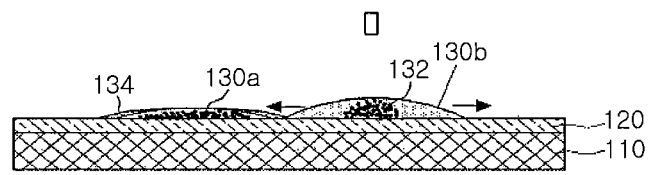
Figure 5B:
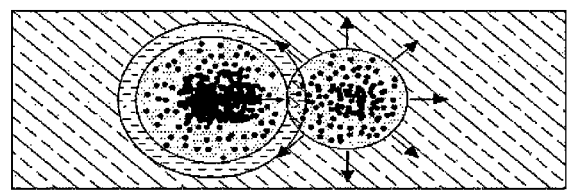
Figure 5C:
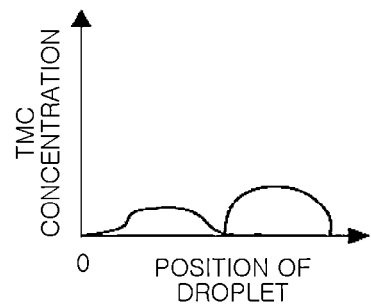

In the case that the droplets of an organic solution is dropped on the aqueous amine solution layer 120 at an interval, a droplet 130a dropped former (will be referred to as "the first droplet" for convenience) is a state of completing the interfacial polymerization with the aqueous amine solution layer when a droplet 130b dropped later (will be referred to as "the second droplet" for convenience) reaches on the aqueous amine solution layer 120 (See FIGS. 4A, 4B and 4C). In this case, the first droplet 130a in which the interfacial polymerization reaction is completed includes a center portion in which the degree of interfacial polymerization is high and a critical area 134 in which the degree of interfacial polymerization is low, as illustrated in FIGS. 3A, 3B and 3C. Meanwhile, the second droplet 130b begins to be spread and planarized after reaching the aqueous amine solution layer 120, and an overlapping area with the first droplet 130a dropped former is formed during the spreading and planarization (See FIGS. 5A, 5B and 5C). However, the overlapping area is in a state in which the reaction with the aqueous amine solution layer is completed by the dropped first droplet 130a in advance, or a state in which the critical area is formed and covers the aqueous amine solution layer. Thus, even though the acyl halide compound included in the second droplet is introduced to the overlapping area, the interfacial polymerization rarely occurs. Therefore, the critical area 134 is formed in the overlapping area between the first droplet and the second droplet, as illustrated in FIG. 6B, and the thickness of a polyamide active layer in this portion may be relatively small (See FIGS. 6A, 6B and 6C). In the case that the droplets of the organic solution are dropped at an interval as described above, the thickness of the interfacial polymerization layer may have a gradient as illustrated in FIG. 6C. As a result, relatively high surface roughness and high specific surface area are attained. In addition, since the polyamide active layer is rarely formed in the critical area, the effect of the increase of permeation flux may be obtained.

The dropping of the droplets one by one as described above may be conducted by dropping the droplets of the organic solution at an interval while moving a porous support including an aqueous amine solution layer formed thereon. In this case, the method of manufacturing a water-treatment separating membrane of the present invention may include forming a polyamide active layer by dropping droplets of an organic solution including an acyl halide compound at an interval on the aqueous amine solution layer, while moving a porous support during forming the polyamide active layer.

When the droplets are dropped while moving the porous support as described above, defects of excessively enlarging the area in which the interfacial polymerization does not occur, may be generated according to the dropping period of the droplets in the moving direction (MD direction) of the porous support and the moving velocity of the porous support, thereby deteriorating salt rejection or excessively increasing the thickness of the polyamide active layer to deteriorate permeation flux. Thus, the forming area or the thickness of the polyamide active layer is required to be controlled by appropriately controlling the moving velocity of the porous support and the dropping period of the droplets in the MD direction. The moving velocity of the porous support and the dropping period of the droplets in the MD direction may be appropriately controlled by considering the volume of the droplet, the dispersing properties of the droplet, the physical properties of the water-treatment separating membrane to be formed, and the like, and preferably, may be controlled in a range satisfying the following Equation 1.

$$0.25R \leq v \times \Delta t \leq 0.75R \quad \text{Equation 1:}$$

where, v is the moving velocity of the porous support, $\Delta t$ is the dropping period of the droplet of the organic solution dropped in the MD direction of the porous support, and R is the length of the longest chord among the chords passing the center of the bottom surface of the planarized droplet, that is, the major diameter of the bottom surface of the droplet of the organic solution after completing planarization.

In this case, the product of the moving velocity v of the porous support and the dropping period $\Delta t$ in the MD direction means the moving distance of the porous support during the time of $\Delta t$, and the distance is the dropping distance between the droplets dropped at an interval. That is, according to the above Equation 1, the distance between the droplets is from 0.25 to 0.75 times of the major diameter of the bottom surface of the droplet after completing the planarization. According to the study of the present inventors, when the distance between the droplets in the MD direction satisfies the above-described range, all of the properties of the specific surface area, the surface roughness, the permeation flux and the salt rejection were good. Meanwhile, when considering the productivity, $\Delta t$ is preferably from 1/60 seconds to 1.5 seconds.

Meanwhile, when the droplets are dropped while moving the porous support, the droplets of the organic solution in the width direction (TD direction) of the porous support may be dropped with a constant time interval as well as the MD direction of the porous support. In this case, the time interval (that is, a dropping period) of the droplets dropped in the TD direction may vary according to the number of the droplets or the volume of the droplets dropped in the TD direction. However, when considering the productivity, the dropping period of the droplets of the organic solution dropped in the TD direction of the porous support may preferably be shorter than the dropping period of the droplets of the organic solution dropped in the MD direction of the porous support. More particularly, the dropping period in the TD direction may be from 0.5 times to 0.8 times of the dropping period in the MD direction.

Figure 7A:
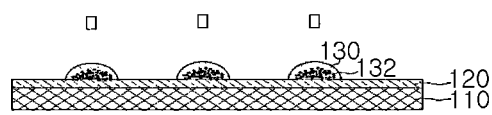
Figure 7B:
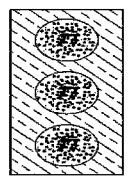
Figure 7C:
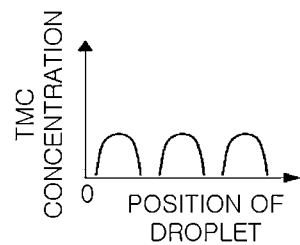
Figure 8A:
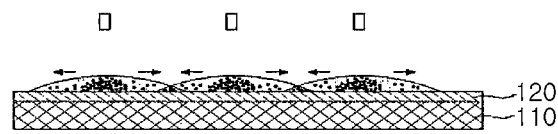
Figure 8B:
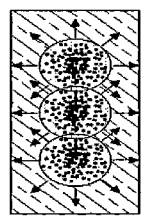
Figure 8C:
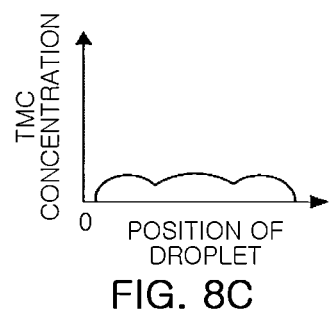
Figure 9A:
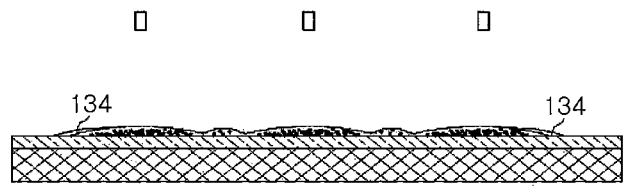
Figure 9B:
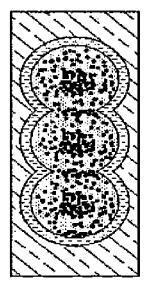
Figure 9C:
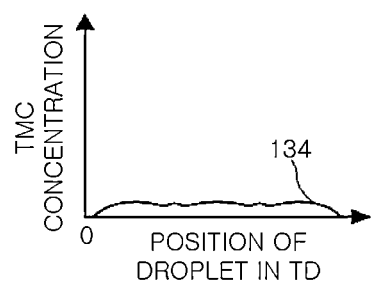

Next, referring to FIGS. 7A to 9C, the changes in states of the droplets when dropping the droplets simultaneously will be explained. Particularly, FIGS. 7A, 7B and 7C provide diagrams illustrating the state of the droplets immediately after the droplets of the organic solution reaches a polyamide active layer, FIGS. 8A, 8B and 8C illustrate diagrams for showing the planarization process of the droplets of the organic solution, and FIGS. 9A, 9B and 9C provide diagrams illustrating the state of the droplets after completing the planarization and interfacial polymerization reaction. In each of the drawings, A is a side view, B is a top view, and C is a graph showing the concentration gradient of an acyl halide compound in droplets or the thickness of interfacial polymerization in the droplets.

As illustrated in FIGS. 7A to 9C, overlapping portions may be formed during the dispersion of the droplets dropped simultaneously in all directions. In the overlapping portions, all of the acyl halide compounds included in two droplets are present, and the concentration of the acyl halide compound is relatively higher than a non-overlapping peripheral portion (See FIG. 8B). Thus, the interfacial polymerization reaction may be actively performed at the overlapping portion of the droplets as well as the center portion of the droplet. As a result, a polyamide active layer having a thickness gradient as illustrated in FIG. 8C may be formed. That is, the critical area 134 is formed at the outermost portion of the dropped droplets simultaneously, and the critical area is not formed at the overlapping portion of the droplets, different from the droplets dropped one by one. Thus, a relatively denser polyamide active layer may be formed from the droplets dropped one by one when compared to the droplets dropped at an interval, and relatively high salt rejection may be realized. However, the increment of the surface roughness may be relatively deteriorated when compared to the method of dropping one by one.

As described above, each of the dropping method simultaneously, and the dropping method one by one has respective merits, and an appropriate method may be used according to the use or the required physical properties of the water-treatment membrane. For example, a water-treatment separating membrane manufactured by the dropping method simultaneously over the whole area may be used when high salt rejection is required, and a water-treatment separating membrane manufactured by dropping method one by one may be used when high chlorine resistance is required.

Alternatively, in view of the productivity, the permeation flux properties, and the salt rejection of the water-treatment separating membrane, the dropping simultaneously and the dropping one by one may be performed together. That is, the dropping may be performed one by one in one direction, for example, in the MD direction, and the dropping in another direction, for example, in the TD direction may be performed simultaneously during manufacturing the water-treatment separating membrane. More particularly, the forming of the polyamide active layer of the present invention may be performed by dropping the droplets of the organic solution dropped in the MD direction of the porous support with a constant time interval and dropping the droplets of the organic solution dropped in the TD direction of the porous support simultaneously.

In this case, the dropping of the droplets of the organic solution dropped in the MD direction may preferably satisfy the above Equation 1, and the dropping distance (D) of the droplets of the organic solution dropped in the TD direction may preferably satisfy the following Equation 2.

$$R' \leq D \leq 3/16(R^2 h) \quad \text{Equation 2:}$$

In Equation 2, R' is the major diameter of a droplet immediately before reaching the aqueous amine solution layer, D is the dropping distance of the droplets dropped in the width, R is the major diameter of a droplet of an organic solution after completing the planarization, and h is the height of a droplet of an organic solution after completing the planarization.

Where "the major diameter" means the length of the longest chord among the chords passing the center of a droplet, the dropping distance (D) of the droplets may be measured by the disposing distance of a dropping device of the droplet such as a dropping pipette, a nozzle, and the like. Particularly, the dropping distance (D) of the droplets may be from 1 mm to 50 mm, for example, from 1 mm to 30 mm, from 10 mm to 30 mm, or from 20 mm to 40 mm.

Figure 10:
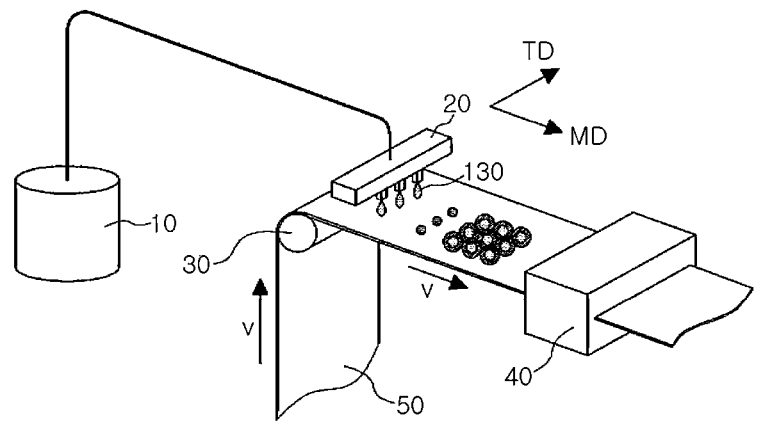
FIG. 10 is a diagram illustrating an embodiment of an apparatus for manufacturing a water-treatment separating membrane according to the present invention.

In FIG. 10, an embodiment of a manufacturing apparatus for realizing the method of manufacturing a water-treatment separating membrane is illustrated. As illustrated in FIG. 10, the method of manufacturing a water-treatment separating membrane according to the present invention may be realized by using an apparatus including an organic solution storing tank 10 for storing an organic solution, a droplet dropping device 20 for dropping droplets of an organic solution on an aqueous amine solution layer, a moving device 30 for moving a porous support 50 on which the aqueous amine solution layer is formed, and a drying device 40. In this case, the droplet dropping device 20 is preferably manufactured so as to drop a plurality of droplets in the TD direction of the porous support simultaneously.

The polyamide active layer of the water-treatment separating membrane of the present invention manufactured by the above-described dropping method includes a center portion in which the degree of interface polymerization of an amine compound formed during the planarization of dropped droplets is high and a critical area in which the degree of interface polymerization with the amine compound is low. In this case, the center portion and the critical area may have different polymerization thicknesses due to the difference of the degree of interface polymerization. As a result, an active layer having higher surface roughness may be obtained when compared to a common polyamide-based water-treatment separating membrane having similar degree of interface polymerization over the whole area of a polyamide active layer. More particularly, the water-treatment separation membrane of the present invention has the high arithmetic mean roughness (Ra) of the surface of the polyamide active layer from 60 nm to 100 nm. As a result, the decrease of chlorine resistance is small after use over an extended period of time, and good permeation flux and salt rejection properties may be obtained. In this case, the arithmetic mean roughness (Ra) may be measured by using, for example, AFM (Digital instruments Nanoscope V MMAFM-8 Multimode).

Meanwhile, the present inventors performed the following experiments to secure the deviation of the degree of polymerization of the polyamide active layer of the water-treatment separating membrane according to the present invention. First, the surface of the polyamide active layer was acid treated using an HCl solution to replace all of the —COCl groups present at the polyamide active layer with —COOH groups. Then, the IR data of the surface of the acid treated polyamide active layer was measured by using a Fourier transform infrared spectrometer. By using the measured IR data, the ratio of the peak height of the C=O double bond of a carboxyl group (—COOH) with respect to the peak height of the C=O double bond combined with an amide group (—CONH—) was measured.

In the experiment, an FTS-7000 by Varian, a piece of ATR (Ge) FT-IR equipment, was used as the Fourier transform infrared spectrometer. The peak of the C=O double bond combined with the amide group was shown near 1663 $cm^{-1}$, and the peak of the C=O double bond of the carboxyl group was shown near 1709 $cm^{-1}$.

From the experimental results, the ratio of the maximum value with respect to the minimum value of the ratio of the peak height of the C=O double bond of the carboxyl group with respect to the peak height of the C=O double bond combined with the amide group was from about 1.2 to about 4, and was preferably from about 1.5 to about 4.

Meanwhile, in the present invention, the ratio of the maximum value with respect to the minimum value of the ratio of the peak height of the C=O double bond of the carboxyl group with respect to the peak height of the C=O double bond combined with the amide group may be preferably calculated by using the IR data measured for the area of at least 5 cm×5 cm, for example, for the area of 5 cm×5 cm, 10 cm×10 cm, or 15 cm×15 cm. In this case, the measured gap of the IR data is preferably from about 1 mm to about 10 mm, for example, from about 1 mm to about 5 mm, or from about 3 mm to about 10 mm in the width direction and height direction.

More particularly, in the water-treatment separating membrane of the present invention, the center portion in which the degree of interface polymerization with the amine compound is high and the critical area in which the degree of interface polymerization with the amine compound is low are formed when the droplets dropped on the polyamide active layer are planarized, as described above. Since the ratio of the amide group formed by the interfacial polymerization in the critical area is low, the ratio of the peak height of the C=O double bond of the carboxyl group with respect to the peak height of the C=O double bond combined with the amide group is high. In addition, since the ratio of the amide group in the center portion is relatively high, the ratio of the peak height of the C=O double bond of the carboxyl group with respect to the peak height of the C=O double bond combined with the amide group is low. For example, in the water-treatment separating membrane of the present invention, the ratio of the peak height of the C=O double bond of the carboxyl group with respect to the peak height of the C=O double bond combined with the amide group shown in the critical area (that is, the maximum value) may be from about 0.17 to about 0.19, and the ratio of the peak height of the C=O double bond of the carboxyl group with respect to the peak height of the C=O double bond combined with the amide group shown in the center portion (that is, the minimum value) may be from about 0.05 to about 0.07.

On the contrary, in the conventional water-treatment separating membrane in which a polyamide active layer is formed by coating an acyl halide organic solution on an aqueous amine solution layer or by immersing into the organic solution, the ratio of the maximum value with respect to the minimum value of the ratio of the peak height of the C=O double bond of the carboxyl group with respect to the peak height of the C=O double bond combined with the amide group in the polyamide active group was very low. More particularly, in the conventional water-treatment separating membrane, the ratio of the peak height of the C=O double bond of the carboxyl group with respect to the peak height of the C=O double bond combined with the amide group was relatively uniform over the whole area and from 0.13 to 0.16. In addition, the ratio of the maximum value with respect to the minimum value of the ratio of the peak height of the C=O double bond of the carboxyl group with respect to the peak height of the C=O double bond combined with the amide group was about 1.13.

As described above, for the polyamide active layer of the water-treatment membrane of the present invention, the deviation of degree of polymerization according to the position is large, and as a result, the surface roughness and the active specific surface area are high, and the time duration of the chlorine resistance is long. As a result, high salt rejection and high permeation flux may be maintained for an extended period of time.

Meanwhile, in the water-treatment separating membrane of the present invention, when the polyamide active layer is dyed using an aqueous solution of 0.5% Rhodamine B by Sigma Aldrich, at least one curve pattern formed through the connection of two or more arcs in at least a partial area of the polyamide active layer is shown. In this case, the term "arc" means a curve connecting two points and includes curve portions obtained by connecting both end points and both end points. The arc may be, for example, a closed circular curve such as a circle, an ellipse, and the like, however, is not limited thereto. In this case, the closed circular curve corresponds to the shape of a bottom surface of a structure formed through planarization after dropping one droplet and need not satisfy the mathematical definition of a circle (that is, the set of all points in a plane that are at a given distance from the center). The concept of the closed circular curve should be understood as including all kinds such as an ellipse, a semicircle, a distorted circle, or uneven closed circles. In addition, the shapes of the closed circular curves forming the curve pattern may be the same or different.

Meanwhile, the major diameter of the closed circular curve may be changed according to the dropping distance of the droplets, the concentration of the acyl halide in the organic solution, and the volume per dropped droplet, and the like, and may not be specifically limited. However, the major diameter may preferably be from about 5 mm to about 100 mm when considering the physical properties of the water-treatment separating membrane, and may more preferably be from about 15 mm to about 35 mm.

In addition, generally, the distance between the centers of the closed circular curves is similarly obtained as the dropping distance of the droplets, and is preferably from about 1 mm to about 50 mm, for example, from about 1 mm to about 30 mm, from about 10 mm to about 30 mm, or from about 20 mm to about 40 mm. Meanwhile, the center of the closed circular curve means the point corresponding to the dropped position of the droplet.

In addition, in the present invention, the closed circular curves may be arranged regularly or irregularly. In this case, the arrangement of the closed circular curves forming the curve pattern may be changed by the dropping distance of the droplets, and a curve pattern having a desired pattern shape may be formed by controlling the dropping distance.

Meanwhile, in the present invention, the thickness of the curve pattern is preferably from about 4% to about 25% of the major diameter of the closed circular curve. In this case, the thickness of the curve pattern means the mean line width of the curve defined by the dyeing. When the major diameter and the thickness of the closed circular curve satisfy the above range, high surface roughness and water purifying performance may be obtained.

Meanwhile, the curve pattern is shown in the critical area in which the polyamide degree of polymerization is low. Since the degree of polymerization in the critical area is low, the polyamide active layer is formed to a less dense structure. Thus, a relatively large amount of the dye may be absorbed and the dyeing in the critical area may be undertaken relatively well when compared to the center portion in which the polyamide active layer is formed to a dense structure. That is, the presence of the critical area having particularly low degree of polymerization in the polyamide active layer of the water-treatment membrane of the present invention may be verified by the dyed pattern.

Figures 11A, 11B:
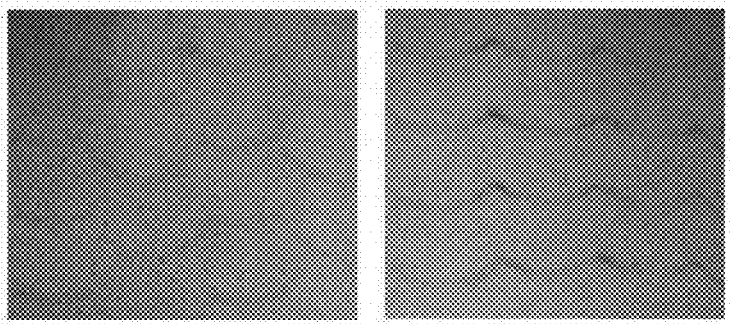
FIG. 11A illustrates a pattern shape obtained when dropping the droplets in the TD direction and the MD direction one by one while moving the porous support in the MD direction.
FIG. 11B illustrates a pattern shape obtained when dropping the droplets in the TD direction simultaneously with a constant gap and dropping the droplets in the MD direction one by one.

The shape of the curve pattern may be different according to the dropping method and the dropping distance of the droplets. FIGS. 11A and 11B illustrate pattern shapes of the polyamide active layer of a water-treatment separating membrane manufactured by the dropping method according to the present invention with a 0.5% aqueous solution of Rhodamine B.

FIG. 11A illustrates a pattern shape obtained when dropping the droplets in the TD direction and the MD direction one by one while moving the porous support in the MD direction. In the curve pattern of the present invention, both end points of each arc may be connected to the curve portion of another arc, as illustrated in FIG. 11A. In this case, at least two arcs are preferably arranged convexly in the same direction (for example in a downward direction).

Meanwhile, FIG. 11B illustrates a pattern shape obtained when dropping the droplets in the TD direction simultaneously with a constant gap and dropping the droplets in the MD direction one by one. As illustrated in FIG. 11B, in the curve pattern of the present invention, two or more arcs are arranged in a row, and adjacent arcs are connected at the end points thereof. In this case, the two or more arcs may preferably be arranged convexly in the same direction (for example, in a downward direction). In the vertical direction (that is, the MD direction) with respect to the arranged direction of the two or more arcs (that is, the TD direction), the curve patterns may be formed repeatedly.

In addition, when the droplets are dropped simultaneously over the whole area of the water-treatment separating membrane, the pattern may not be formed at the center portion of the polyamide active layer; however, curved patterns may be formed only at the four outermost borders, even though not illustrated. More particularly, in this case, two curve patterns in which two or more arcs are arranged in a row in the MD direction, and adjacent arcs are connected at the endpoints thereof, and two curve patterns in which two or more arcs are arranged in a row in the TD direction, and adjacent arcs are connected at the end points thereof, may be formed.

Figure 12:
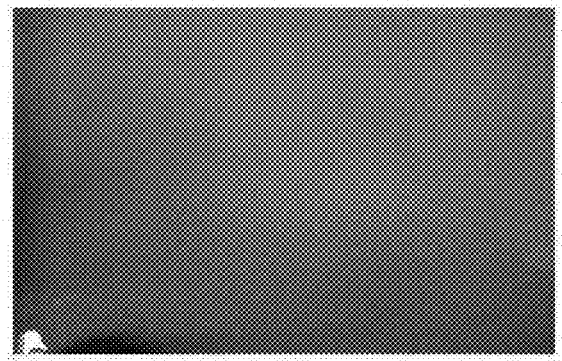
FIG. 12 illustrates a photographic image taken after dyeing a water-treatment separating membrane manufactured by a common bar coating method with a 0.5% aqueous solution of Rhodamine B.

Meanwhile, FIG. 12 is a photographic image taken after dyeing a polyamide active layer manufactured by slot-coating an acyl halide organic solution on an aqueous amine solution layer, with a 0.5% aqueous solution of Rhodamine B. As illustrated in FIG. 12, in the polyamide active layer manufactured by the convention method, no specific pattern is shown even after being dyed using the aqueous Rhodamine B solution.

Meanwhile, the water-treatment separating membrane of the present invention may be used in micro filtration, ultra filtration, nano filtration, or reverse osmosis, and may be preferably used in reverse osmosis.

In addition, there is provided in the present invention, a water-treatment module including at least one water-treatment separating membrane according to the present invention. Particular kinds of the water-treatment module of the present invention is not specifically limited, and includes a plate & frame module, a tubular module, a hollow & fiber module, or a spiral would module. In addition, the constitution and the manufacturing method of the water-treatment module of the present invention are not specifically limited only if including the water-treatment separating membrane of the present invention, and may include commonly known methods without limitation.

The water-treatment module of the present invention may be usefully used in a water-treatment apparatus such as a piece of domestic/industrial water purifying equipment, a piece of sewage treatment equipment, a piece of seawater/fresh water treatment equipment, and the like.

Hereinafter the present invention will be explained in more detail referring to particular embodiments.

Example 1

18 wt % of the solid content of polysulfone was added to a N,N-dimethylformamide (DMF) solution and dissolved at from 80° C. to 85° C. for 12 hours or more to obtain a homogeneous liquid phase. This solution was cast to a thickness of from 45 μm to 50 μm on a non-woven fabric having a thickness of from 95 μm to 100 μm to form a porous polysulfone support.

The porous polysulfone support thus manufactured was immersed in an aqueous solution including 2 wt % of metaphenylenediamine, 1 wt % of triethylamine and 2.3 wt % of camphor sulfonic acid for 2 minutes and taken out. Excessive aqueous solution on the support was removed by using a 25 psi roller, and the support was dried at room temperature for 1 minute.

Then, an organic solution including 0.1 vol % of trimesoyl chloride in a non-polar organic solvent (an alkane compound having 5 to 12 carbon atoms), ISOL-C (CAS No. 64741-66-8, manufactured by SKC) was dropped on a porous support on which an aqueous amine solution layer was formed with the amount of 100 ml per 1 $m^2$ of the porous support, while moving the porous support by the linear velocity of 1 m/min. In this case, the volume of the organic solution per droplet was 0.01 ml, the droplets were dropped simultaneously with the gap of 1 cm in the width direction of the porous support, and the droplet was dropped with the period of 1.7 times/sec in the moving direction. After the dropping, drying was performed in an oven at 60° C. for 10 minutes to manufacture a water-treatment separating membrane.

Example 2

A water-treatment separating membrane was manufactured by performing the same procedure described in Example 1 except that the dropping volume of the organic solution per droplet was 0.05 ml, and the dropping of the droplet was performed with the period of 0.34 times/sec in the moving direction of the porous support.

Example 3

A water-treatment separating membrane was manufactured by performing the same procedure described in Example 1 except that the dropping volume of the organic solution per droplet was 0.1 ml, and the dropping of the droplet was performed with the period of 0.17 times/sec in the moving direction of the porous support.

Example 4

A water-treatment separating membrane was manufactured by performing the same procedure described in Example 1 except that the dropping volume of the organic solution per droplet was 0.2 ml, and the dropping of the droplet was performed with the period of 0.09 times/sec in the moving direction of the porous support.

Example 5

A water-treatment separating membrane was manufactured by performing the same procedure described in Example 1 except that 200 ml of the organic solution per 1 $m^2$ of the porous support was dropped, and the dropping volume of the organic solution per droplet was 0.02 ml.

Example 6

A water-treatment separating membrane was manufactured by performing the same procedure described in Example 2 except that 200 ml of the organic solution per 1 $m^2$ of the porous support was dropped, and the dropping volume of the organic solution per droplet was 0.1 ml.

Example 7

A water-treatment separating membrane was manufactured by performing the same procedure described in Example 3 except that 200 ml of the organic solution per 1 $m^2$ of the porous support was dropped, and the dropping volume of the organic solution per droplet was 0.2 ml.

Example 8

A water-treatment separating membrane was manufactured by performing the same procedure described in Example 4 except that 200 ml of the organic solution per 1 $m^2$ of the porous support was dropped, and the dropping volume of the organic solution per droplet was 0.4 ml.

Example 9

A water-treatment separating membrane was manufactured by performing the same procedure described in Example 3 except that the moving velocity of the porous support on which an aqueous amine solution layer was formed was 2 m/min, and 200 ml of the organic solution per 1 $m^2$ of the porous support was dropped.

Example 10

A water-treatment separating membrane was manufactured by performing the same procedure described in Example 4 except that the moving velocity of the porous support on which an aqueous amine solution layer was formed was 2 m/min, and 200 ml of the organic solution per 1 $m^2$ of the porous support was dropped.

Example 11

18 wt % of the solid content of polysulfone was added to a N,N-dimethylformamide (DMF) solution and dissolved at from 80° C. to 85° C. for 12 hours or more to obtain a homogeneous liquid phase. This solution was cast to a thickness of from 45 μm to 50 μm on a non-woven fabric having a thickness of from 95 μm to 100 μm, to form a porous polysulfone support.

The porous polysulfone support thus manufactured was immersed in an aqueous solution including 2 wt % of metaphenylenediamine, 1 wt % of triethylamine and 2.3 wt % of camphor sulfonic acid for 2 minutes and taken out. Excessive aqueous solution on the support was removed by using a 25 psi roller, and the support was dried at room temperature for 1 minute.

Then, an organic solution including 0.1 vol % of trimesoyl chloride in a non-polar organic solvent (an alkane compound having 5 to 12 carbon atoms), ISOL-C (CAS No. 64741-66-8, manufactured by SKC) was dropped simultaneously through a spray nozzle on a porous support on which an aqueous amine solution layer was formed to perform an interfacial polymerization reaction. In this case, the organic solution was dropped with the amount of 250 ml per 1 m² of the surface area of the porous support, the volume of the organic solution per droplet was 0.005 ml, and the dropping area was 10 cm×10 cm. After the dropping, drying was performed in an oven at 60° C. for 10 minutes to manufacture a coating layer.

Example 12

An experiment was performed by the same procedure described in Example 11 except that the dropping volume of the organic solution per droplet was 0.01 ml.

Example 13

An experiment was performed by the same procedure described in Example 11 except that the dropping volume of the organic solution per droplet was 0.02 ml.

Example 14

An experiment was performed by the same procedure described in Example 11 except that the dropping volume of the organic solution per droplet was 0.03 ml.

Example 15

An experiment was performed by the same procedure described in Example 11 except that the dropping volume of the organic solution per droplet was 0.05 ml.

Example 16

An experiment was performed by the same procedure described in Example 11 except that the dropping volume of the organic solution per droplet was 0.07 ml.

Example 17

An experiment was performed by the same procedure described in Example 11 except that the dropping volume of the organic solution per droplet was 0.1 ml.

Example 18

An experiment was performed by the same procedure described in Example 11 except that the dropping volume of the organic solution per droplet was 0.15 ml.

Example 19

An experiment was performed by the same procedure described in Example 11 except that the dropping volume of the organic solution per droplet was 2.0 ml.

Comparative Example 18 wt % of the solid content of polysulfone was added to a N,N-dimethylformamide (DMF) solution and dissolved at from 80° C. to 85° C. for 12 hours or more to obtain a homogeneous liquid phase. This solution was cast to a thickness of from 45 μm to 50 μm on a non-woven fabric having a thickness of from 95 μm to 100 μm, to form a porous polysulfone support.

The porous polysulfone support thus manufactured was immersed in an aqueous solution including 2 wt % of metaphenylenediamine, 1 wt % of triethylamine and 2.3 wt % of camphor sulfonic acid for 2 minutes and taken out. Excessive aqueous solution on the support was removed by using a 25 psi roller, and the support was dried at room temperature for 1 minute.

Then, an organic solution including 0.1 vol % of trimesoyl chloride in a non-polar organic solvent (an alkane compound having 5 to 12 carbon atoms), ISOL-C (CAS No. 64741-66-8, manufactured by SKC) was uniformly coated on a porous support on which an aqueous amine solution layer was formed to perform an interfacial polymerization reaction. After the coating, drying was performed in an oven at 60° C. for 10 minutes to manufacture a coating layer.

Experiment 1

Evaluation of Water Purification Performance

The initial salt rejection and the initial permeation flux of reverse osmosis membranes manufactured by Examples 1 to 19 and the Comparative Example were measured under the pressure of 800 psi. The initial salt rejection and the initial permeation flux were measured at 25° C. while supplying an aqueous sodium chloride solution of 32,000 ppm by the flow rate of 4,500 mL/min. A reverse osmosis membrane cell apparatus used for the evaluation of the membranes was equipped with a flat type permeation cell, a high pressure pump, a storing bath and a cooling device, and the structure of the flat type permeation cell had a cross-flow manner and an effective permeation area of 28 cm². After installing a washed reverse osmosis membrane in the permeation cell, a preliminary driving was sufficiently performed for about 1 hour by using ultra pure water, that is, tertiary distilled water for the stabilization of the apparatus for the evaluation. Then, the ultra pure water was replaced with the aqueous sodium chloride solution of 32,000 ppm, and the apparatus was operated for 1 hour until the pressure and the permeation flux reached a stationery state. Then, the flux was calculated by measuring the amount of water permeated for 10 minutes, and the salt concentration was calculated by analyzing the concentration of a salt before and after the permeation by using a conductivity meter.

The measured results are illustrated in the following Table 1.

TABLE 1

| | Initial salt rejection (%) | Initial permeation flux (gallon/ft² · day) |
|---|---|---|
| Example 1 | 97.05 | 48.66 |
| Example 2 | 99.65 | 40.23 |
| Example 3 | 99.71 | 38.90 |
| Example 4 | 99.66 | 36.84 |
| Example 5 | 99.58 | 37.16 |
| Example 6 | 99.51 | 36.09 |
| Example 7 | 99.48 | 35.53 |
| Example 8 | 99.47 | 35.47 |
| Example 9 | 99.47 | 37.57 |
| Example 10 | 99.23 | 40.51 |
| Example 11 | 98.89 | 31.69 |
| Example 12 | 99.00 | 31.92 |
| Example 13 | 99.15 | 36.34 |
| Example 14 | 99.29 | 41.64 |
| Example 15 | 99.18 | 42.82 |
| Example 16 | 99.16 | 40.55 |
| Example 17 | 99.22 | 38.71 |
| Example 18 | 98.74 | 36.45 |
| Example 19 | 94.21 | 30.01 |
| Comparative Example | 98.87 | 25.25 |

As illustrated in the above Table 1, it would be fount that the water-treatment separating membranes of Examples 1 to 19 manufactured by the dropping method of the organic solution on the porous support on which the aqueous amine solution layer was formed, had good permeation flux and salt rejection when compared to that manufactured in the Comparative Example through the uniform coating. Since the droplet falls free, the organic solution may penetrate into the deep inner portion of the support, and a dense polyamide layer may be formed in the pore of the surface of the support, and the surface of the polyamide layer may have a large active specific surface area.

Experimental Example 2

Evaluation of Chlorine Resistance with Time

The reverse osmosis membranes manufactured in Example 2, Example 14 and the Comparative Example were evaluated. The initial salt rejection and the initial permeation flux were measured at 800 psi using an aqueous mixture solution of NaCl of 32,000 ppm and NaOCl of 2,000 ppm. Then, the salt rejection and the permeation flux were measured after 6 hours and 12 hours. The measured results are illustrated in the following Table 2.

TABLE 2

|  | Salt rejection (%) | | | Permeation flux ((gallon/ft² · day)) | | |
| --- | --- | --- | --- | --- | --- | --- |
|  | Right after adding NaOCl | After exposing to NaOCl for 6 hr | After exposing to NaOCl for 12 hr | Right after adding NaOCl | After exposing to NaOCl for 6 hr | After exposing to NaOCl for 12 hr |
| Example 2 | 99.65 | 99.49 | 99.38 | 40.23 | 40.85 | 41.07 |
| Example 14 | 99.31 | 96.03 | 95.47 | 41.82 | 40.35 | 39.84 |
| Comparative Example | 98.85 | 94.31 | 76.39 | 25.38 | 25.08 | 24.15 |

As shown in the above Table 2, the decrease of the salt rejection after exposing to NaOCl for 6 hours and 12 hours was, respectively, 4.59% and 22.7% for the Comparative Example. On the contrary, the decrease of the salt rejection after exposing to NaOCl for 6 hours and 12 hours was, respectively, 0.16% and 0.27% for Example 2, and 3.3% and 3.87% for Example 14. That is, the decrease of the water purifying properties due to the exposure to chlorine of the water-treatment separating membrane of the present invention is very small when compared to that of the Comparative Example.

Experimental Example 3

Measurement of Surface Roughness

Specimens having 5 μm×5 μm of the water-treatment separating membranes manufactured by Example 14, Example 15, Example 17 and the Comparative Example were manufactured, and roughness analysis was performed for the whole size of the specimens by using AFM (Digital instruments Nanoscope V MMAFM-8 Multimode) to measure the Ra value. The measured results are illustrated in the following Table 3.

TABLE 3

| Specimen | Ra (nm) |
| --- | --- |
| Example 14 | 68.65 |
| Example 15 | 69.40 |
| Example 17 | 65.45 |
| Comparative Example | 38.65 |

From the results of Table 3, it would be fount that the arithmetic mean roughness (Ra) value of the water-treatment separating membrane manufactured by the method of the present invention is greater than that of the water-treatment separating membrane of the Comparative Example.

Experimental Example 4

IR Data Analysis

The water-treatment membranes manufactured by Example 2 and the Comparative Example were cut into the size of 5 cm×5 cm to form specimens, and the specimens were acid treated by immersing into an HCl solution. Then, IR data were measured at the surface of the treated specimen by 5 mm distance of length and width by using FTS7000 by Varian, that is an ATR (Ge) FT-IR equipment, and the ratio of the peak height of the C=O double bond of a carboxyl group with respect to the peak height of the C=O double bond combined with an amide group was calculated. The minimum value and the maximum value of the calculated values were secured. The results are illustrated in the following Table 4.

TABLE 4

| Division | Minimum value | Maximum value |
| --- | --- | --- |
| Example 2 | 0.057 | 0.191 |
| Comparative Example | 0.1391 | 0.1575 |

As illustrated in the above Table 4, the degree of polymerization of the amine compound and the acyl halide compound is largely different according to the position of the polyamide active layer of Example 2. On the contrary, it would be found that the degree of polymerization of the polyamide active layer of the Comparative Example is relatively uniform over the whole area.

EXPLANATION OF REFERENCE NUMERALS

10: organic solution tank
20: dropping means
30: moving means
40: drying means 50: a porous support including an aqueous amine solution layer formed thereon
130, 130a, 130b: an acyl halide compound
132: a droplets of the organic solution
134: critical area

What is claimed is:

1. A method of manufacturing a water-treatment separating membrane, the method comprising:
   forming an aqueous amine solution layer on a porous support; and
   forming a polyamide active layer by dropping a droplet of an organic solution comprising an acyl halide compound on the aqueous amine solution layer,
   wherein a volume of the organic solution per droplet is from 0.001 ml to 5 ml,
   wherein at least one curve pattern formed by connecting two or more arcs in at least a partial area of the polyamide active layer is revealed when the polyamide active layer is dyed using a 0.5% aqueous solution of Rhodamine B for showing the curve pattern, and
   wherein an arithmetic mean roughness (Ra) of a surface of the polyamide active layer is from 60 nm to 100 nm.

2. The method of manufacturing a water-treatment separating membrane of claim 1, wherein the dropping is performed by using a dropping pipette, a syringe or a spray nozzle.

3. The method of manufacturing a water-treatment separating membrane of claim 1, wherein a dropping amount of the organic solution per a unit area of 1 m² is from 50 ml to 500 ml.

4. The method of manufacturing a water-treatment separating membrane of claim 1, wherein a dropping distance of the droplet of the organic solution is regular or irregular.

5. The method of manufacturing a water-treatment separating membrane of claim 1, wherein a dropping distance (D) of the droplet of the organic solution is from 1 mm to 50 mm.

6. The method of manufacturing a water-treatment separating membrane of claim 1, wherein the droplets of the organic solution are dropped simultaneously or one by one.

7. The method of manufacturing a water-treatment separating membrane of claim 1, wherein the droplets of the organic solution are dropped simultaneously in a first direction, and dropped one by one in a second direction that is perpendicular to the first direction.

8. The method of manufacturing a water-treatment separating membrane of claim 1, wherein the forming of the polyamide active layer is performed by dropping the droplets of the organic solution including an acyl halide compound with a constant time interval on the aqueous amine solution layer while moving the porous support.

9. The method of manufacturing a water-treatment separating membrane of claim 8, wherein the forming of the polyamide active layer is performed so as to satisfy following Equation 1:

$$0.25R \leq v \times \Delta t \leq 0.75R \qquad \text{Equation 1:}$$

where v is a moving velocity of the porous support, $\Delta t$ is a dropping period of the droplet of the organic solution dropped in a moving direction of the porous support, and R is a major diameter of a bottom surface of the droplet of the organic solution after completing a planarization of the droplets.

10. The method of manufacturing a water-treatment separating membrane of claim 9, wherein the $\Delta t$ is from 1/60 seconds to 1.5 seconds.

11. The method of manufacturing a water-treatment separating membrane of claim 8, wherein the forming of the polyamide active layer comprises:
   dropping the droplets of the organic solution with a constant time interval in a moving direction (MD direction) of the porous support, and
   dropping the droplets of the organic solution simultaneously in a width direction (TD direction) of the porous support.

12. The method of manufacturing a water-treatment separating membrane of claim 11, wherein a dropping distance (D) of the droplets of the organic solution dropped in the TD direction of the porous support satisfies following Equation 2:

$$R' \leq D \leq 3/16(R^2 h) \qquad \text{Equation 2:}$$

where R' is a major diameter of a droplet just before reaching the aqueous amine solution layer, D is a dropping distance of the droplets dropped in the TD direction, R is a major diameter of a droplet of an organic solution after completing a planarization of the droplets, and h is a height of a droplet of an organic solution after completing planarization.

13. The method of manufacturing a water-treatment separating membrane of claim 8, wherein the forming of the polyamide active layer comprises:
   dropping the droplets of the organic solution at an interval in a moving direction (MD direction) of the porous support and a width direction (TD direction) of the porous support,
   wherein a dropping period of the droplets of the organic solution dropped in the TD direction of the porous support is shorter than a dropping period of the droplets of the organic solution dropped in the MD direction of the porous support.

14. The method of manufacturing a water-treatment separating membrane of claim 13, wherein the dropping period of the droplets of the organic solution dropped in the TD direction of the porous support is from 0.5 times to 0.8 times of the dropping period of the droplets of the organic solution dropped in the MD direction of the porous support.

15. A water-treatment separating membrane comprising a polyamide active layer on a porous support,
   wherein the polyamide active layer is formed by dropping droplets of an organic solution comprising an acyl halide compound on an aqueous amine solution layer and includes a center portion in which a degree of an interface polymerization of the organic solution is high and a critical area in which the degree of the interface polymerization of the organic solution is low,
   a volume of the organic solution per droplet is from 0.001 ml to 5 ml,
   at least one curve pattern formed by connecting two or more arcs in at least a partial area of the polyamide active layer is revealed when the polyamide active layer is dyed using a 0.5% aqueous solution of Rhodamine B for showing the curve pattern, and
   an arithmetic mean roughness (Ra) of a surface of the polyamide active layer is from 60 nm to 100 nm.

16. A water-treatment module comprising at least one water-treatment separating membrane of claim 15.

17. A water-treatment apparatus comprising at least one water-treatment module of claim 16.

* * * * *